UNITED STATES PATENT OFFICE.

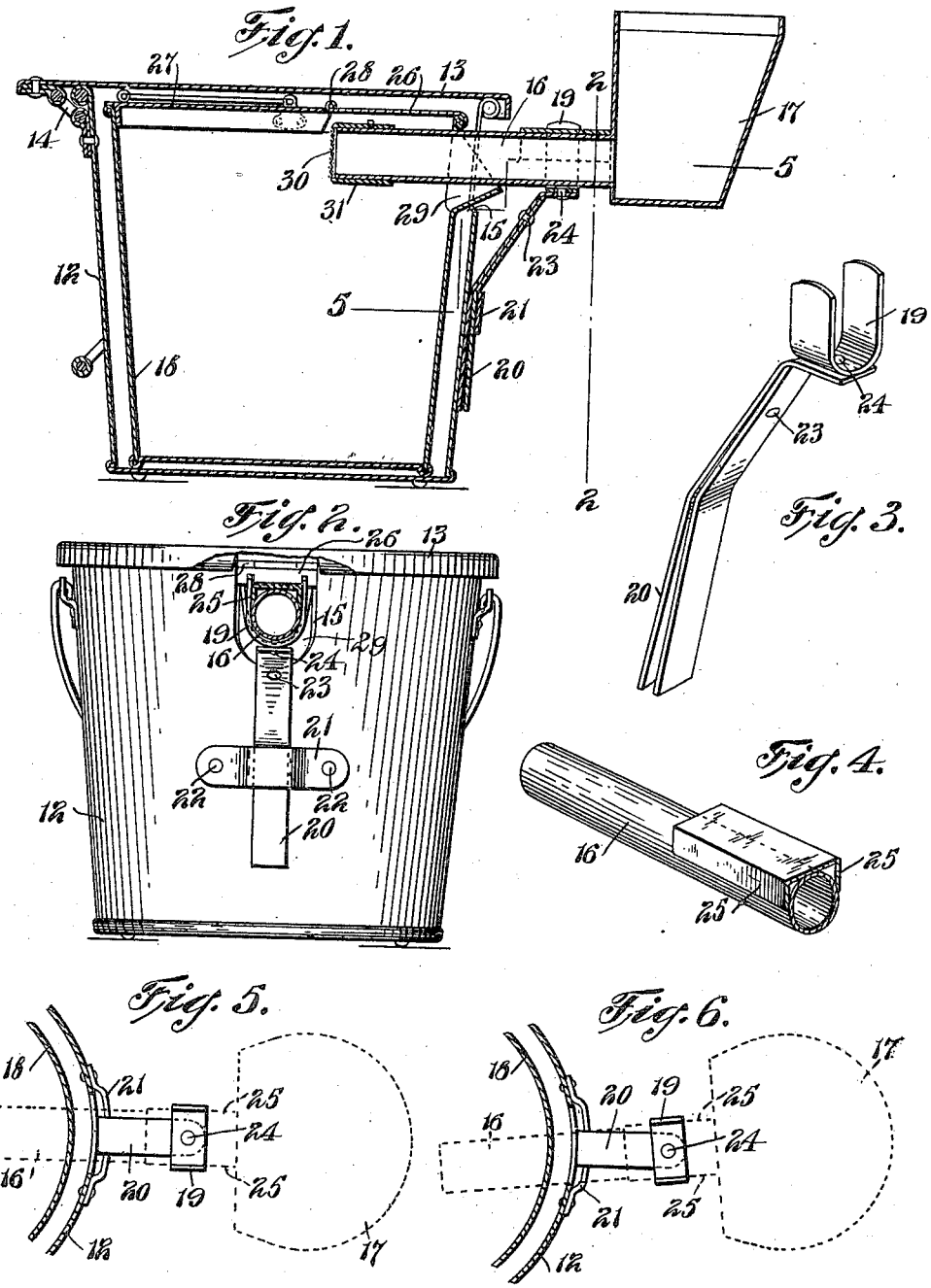

ALEXANDER BRUCE, OF WALTHAM, MASSACHUSETTS.

MILKING APPLIANCE.

972,596.  Specification of Letters Patent.  Patented Oct. 11, 1910.

Application filed February 8, 1910.  Serial No. 542,719.

*To all whom it may concern:*

Be it known that I, ALEXANDER BRUCE, of Waltham, in the county of Middlesex and State of Massachusetts, have invented certain new and useful Improvements in Milking Appliances, of which the following is a specification.

This invention relates to a milking appliance which includes a milk receptacle and a seat for the milker, a cup being provided which is adapted to receive the milk from the udder of the cow, and has a tube extending through an orifice in the receptacle and adapted to conduct milk to the interior of the receptacle. The cup and tube are adjustable relatively to the receptacle, so that the cup may be caused to occupy different positions relatively to the receptacle, such as may be required by the size of the cow, and changes of position of the cow during the milking operation.

The invention has for its object to provide improved means for adjustably supporting the cup and tube and providing for all the relative changes of position that may be required.

The invention consists in the improvements which I will now proceed to describe and claim.

Of the accompanying drawings, forming a part of this specification,—Figure 1 represents a vertical sectional view of a milking appliance embodying my invention. Fig. 2 represents a section on line 2—2 of Fig. 1, and an elevation of the parts at the left of said line. Fig. 3 represents a perspective view of the tube-engaging clip, hereinafter referred to, and its supporting shank detached from the receptacle. Fig. 4 represents a perspective sectional view showing a portion of the tube. Fig. 5 represents a section on line 5—5 of Fig. 1, the cup and tube being shown in dotted lines. Fig. 6 represents a view similar to Fig. 5, showing a different adjustment of the cup and tube.

The same reference characters indicate the same parts in all the figures.

In the drawings,—12 represents a receptacle which preferably has the general form of a tapering pail or bucket, and which is preferably made of sheet metal.

13 represents a movable cover which is connected by a hinge 14 of any suitable construction to the receptacle 12, and is adapted when closed to serve as a milker's seat.

The receptacle is provided at one side with an orifice 15 formed in the upper portion and adapted to receive a tube 16 which is connected with a cup 17, the tube being adjustably supported on the receptacle by means hereinafter described, so that the cup 17 is held projected from one side of the receptacle in position to receive milk during the milking operation. The milk flows from the cup 17 through the tube 16 into the interior of the receptacle, and preferably into an inner receptacle or pail 18 formed to be inclosed in the receptacle 12. During the milking operation, the cup 17 occupies a position between the knees of the milker, the adjustability of the cup and tube being such that the cup may be moved horizontally toward and from the receptacle, and may be swung horizontally toward either side and tilted at various angles, these adjustments enabling the milker to accommodate the cup to the size or height of the cow, and to changes of position of the cow during the milking operation, so that the milker's seat does not require to be correspondingly changed in position.

In carrying out my invention, I provide a clip 19 which is adapted to embrace the sides of the tube 16, and thus support the latter and the cup 17, means being provided for supporting the clip in various positions relatively to the receptacle. As here shown, said means include a shank 20 with which the clip 19 is connected, and a confining member 21 attached to the receptacle 12. The said confining member is preferably a sheet metal strip, the end portions of which are attached at 22 to the receptacle 12, the central portion being offset from the receptacle so that the shank 20 is adapted to be inserted between the said strip and the outer surface of the receptacle. The shank has a close frictional fit on the strip or confining member 21, and the corresponding surface of the receptacle, so that it will be held by friction at various heights and at various angles. As here shown, the shank 20 is composed of two resilient sheet metal leaves or strips riveted together at 23, and adapted to normally spring apart at their lower end portions, the tendency of said portions to separate increasing the frictional hold of the shank on the surfaces of the strip 21 and receptacle 12. The clip 19 is preferably pivoted at 24 to the upper end portion of the shank, the clip being thus adapted to turn on a vertical axis relatively to the shank, and thus enable the cup to be swung horizontally, as indicated by Figs. 5 and 6. The clip is of resilient construction, it being preferably a U-shaped strip of resilient sheet metal. The sides of the clip are adapted to bear yieldingly against the sides of the tube 16, the tube being longitudinally movable in the clip to vary the projection of the cup from the receptacle 12. I prefer to provide the portion of the tube which engages the clip with flat faces 25 which have an extended bearing on the sides of the clip, and prevent the tube from turning loosely therein. The clip is therefore adapted to maintain the cup in an upright position while permitting it to be moved toward and from the receptacle 12. The described construction enables the tube to be held in an inclined position by the clip if desired, provision being thus made for tilting the cup upwardly and holding the tube at a suitable inclination to cause the milk to flow freely through it. The inner receptacle 18 is also preferably made of sheet metal, and as here shown, has a permanent top or cover portion 26, and a movable cover portion 27 which is hinged at 28. One side of the inner receptacle 18 has an orifice for the reception of the tube 16, and a flange 29 partly surrounding said orifice, the outer edge of the flange being curved to conform to the curvature of the tube, and thus prevent the entrance of foreign matter into the inner receptacle. The flange 29 also constitutes a spout through which the contents of the inner receptacle may be poured.

A strainer 30 may be removably applied to the inner end of the tube 16, said strainer being preferably a piece of cheesecloth confined on the tube by a sleeve or ferrule 31.

The shank 20 may be withdrawn from between the confining member 21 and the receptacle when it is desired to cleanse the parts. The tube is also readily separable from the clip so that the cup and tube are adapted to be cleansed separately from the other parts.

I claim:

1. A milking appliance comprising a receptacle having a movable cover forming a seat, and an orifice below said cover, a clip movably mounted on the receptacle adjacent to the said orifice, and adapted to occupy different positions relatively to the receptacle, and a milk-receiving cup having a conducting tube longitudinally movable in the clip and extending through the orifice into the receptacle, said cup and tube being adjustable relatively to the receptacle by the longitudinal movability of the tube in the clip, and by the movability of the clip relatively to the receptacle.

2. A milking appliance comprising a receptacle having a movable cover forming a seat, an orifice below said cover, and a confining member below the orifice, a clip having a shank slidably and frictionally engaged with said confining member and receptacle whereby the clip is adjustably supported relatively to the receptacle, and a milk-receiving cup having a conducting tube longitudinally movable in the clip and extending through the orifice into the receptacle.

3. A milking appliance comprising a receptacle having a movable cover forming a seat, an orifice below said cover, and a confining member below the orifice, a clip having a shank slidably and frictionally engaged with said confining member and receptacle whereby the clip is adjustably supported relatively to the receptacle, and a milk-receiving cup having a conducting tube longitudinally movable in the clip and extending through the orifice into the receptacle, the clip being pivoted to the shank and adapted to turn thereon to permit additional adjustments of the cup and tube.

4. A milking appliance comprising a receptacle having a movable cover forming a seat, an orifice below said cover, and a metal strip attached at its end portions to the receptacle below the orifice, the central portion of the strip being offset and constituting a confining member, a clip having a shank adapted to be inserted between the said offset portion and the receptacle, and frictionally supported thereby, and a milk-receiving cup having a conducting tube frictionally engaged by the clip and longitudinally movable therein.

5. A milking appliance comprising a receptacle having a movable cover forming a seat, an orifice below said cover, and a metal strip attached at its end portions to the receptacle below the orifice, the central portion of the strip being offset and constituting a confining member, a clip having a shank adapted to be inserted between the said offset portion and the receptacle, and frictionally supported thereby, and a milk-receiving cup having a conducting tube frictionally engaged by the clip and longitudinally movable therein, a portion of the tube being provided with flat faces bearing on the sides of the clip.

6. A milking appliance comprising a receptacle having a movable cover forming a seat, and an orifice below said cover, a clip movably mounted on the receptacle adjacent to the said orifice, and adapted to occupy different positions relatively to the receptacle, a milk-receiving cup having a conducting tube longitudinally movable in the clip and extending through the orifice into the receptacle, said cup and tube being adjustable relatively to the receptacle by the longitudinal movability of the tube in the clip, and by the movability of the clip relatively to the receptacle, and an inner receptacle having a cover, a tube-receiving orifice below the cover, and a spout flange projecting outwardly from said orifice, and conforming to the tube.

In testimony whereof I have affixed my signature, in presence of two witnesses.

ALEXANDER BRUCE.

Witnesses:
C. F. BROWN,
P. W. PEZZETTI.